Jan. 20, 1931.  H. A. BUNTE  1,789,723
MECHANICAL BATTLE ROYAL
Filed May 16, 1929   3 Sheets-Sheet 1
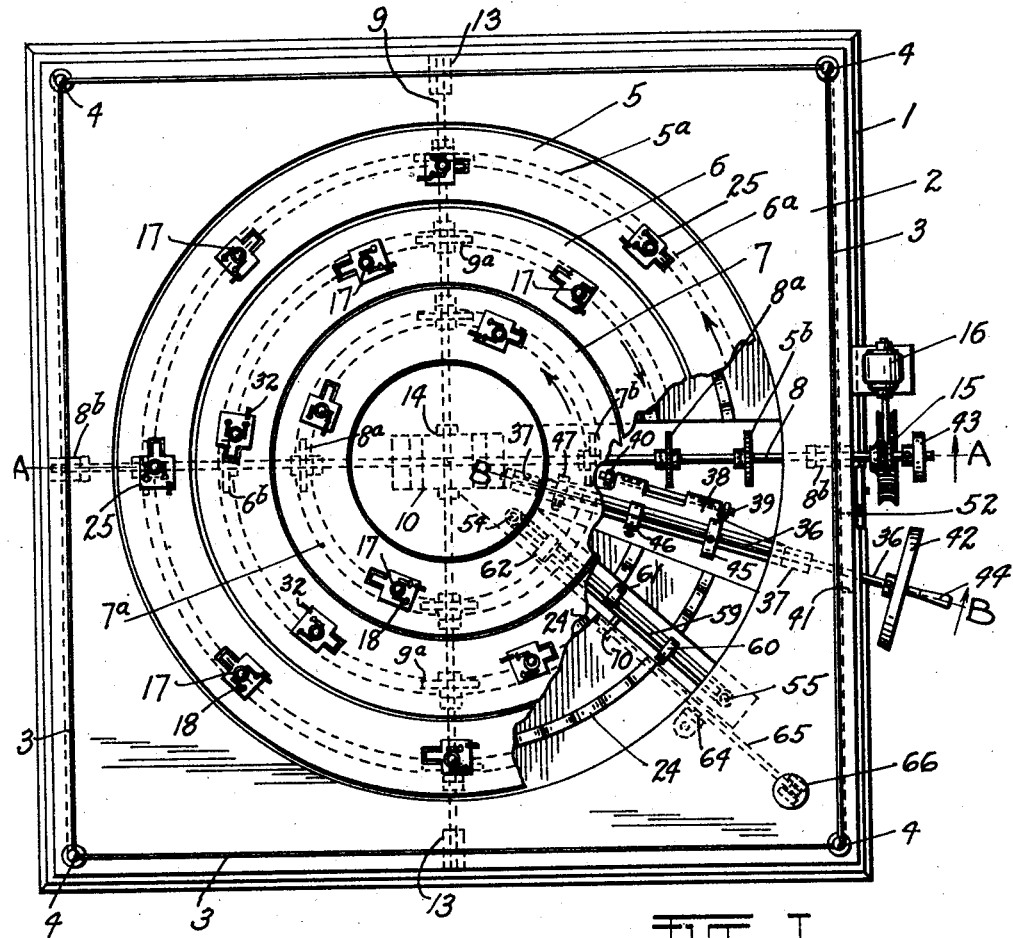
Fig. I.
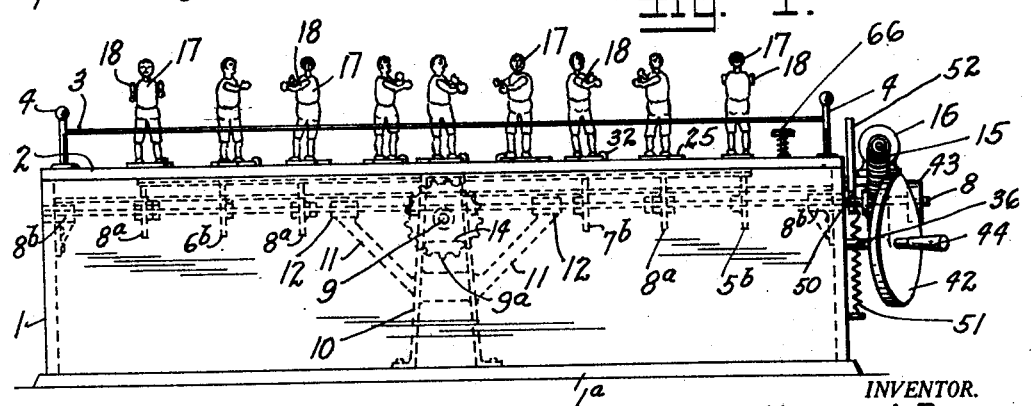
Fig. II.
INVENTOR.
HARRY A. BUNTE
BY Whitehead & Vogl
PER Carle Whitehead
ATTORNEY.

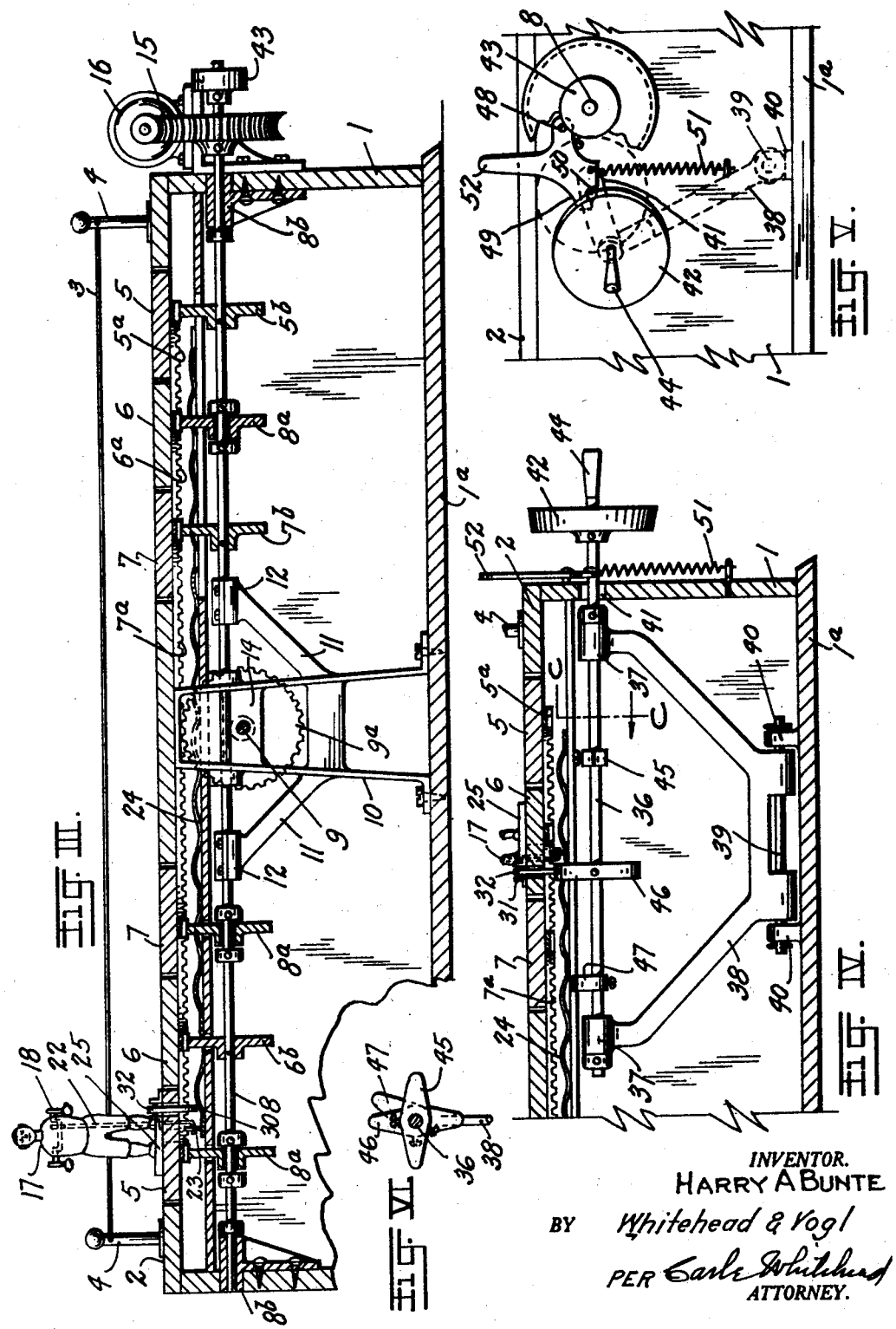

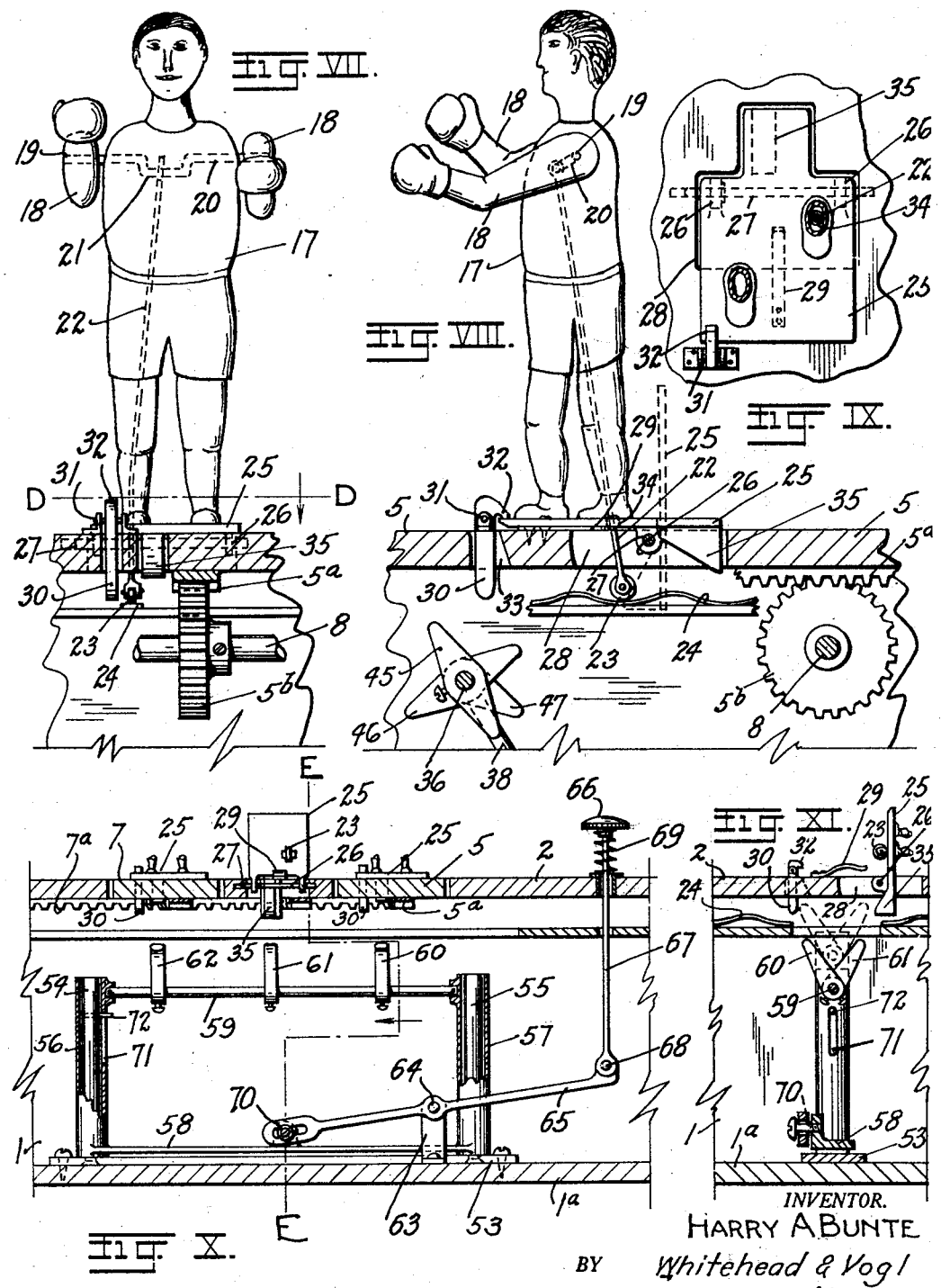

Patented Jan. 20, 1931

1,789,723

UNITED STATES PATENT OFFICE

HARRY A. BUNTE, OF GRAND LAKE, COLORADO, ASSIGNOR OF ONE-THIRD TO A. EDWARD LYNN, AND ONE-THIRD TO PHILIP P. FRIEDERICH, BOTH OF DENVER, COLORADO

MECHANICAL BATTLE ROYAL

Application filed May 16, 1929. Serial No. 363,495.

This invention relates to mechanical amusement devices and has for an object to provide a mechanical device which in effect will be an imitation of what is commonly known as a battle royal or gang fight, the object being to simulate a fight between a considerable number of persons in which the one last remaining standing is the winner.

A further object is to provide such an apparatus in the operation of which it will be impossible to determine in advance which one of the mechanical figures simulating the fighters will be the survivor.

A further object is to provide an apparatus of the class described which will be simple in construction and easily operated, considering the objects and purposes of the apparatus, and which can be manufactured at a sufficiently low expense to make the apparatus available for common use at fairs, amusements parks, etc.

With these and other objects in view which will clearly appear hereinafter, the invention comprises certain novel constructions, combinations and arrangements of parts, as hereinafter fully described, defined in the claims and illustrated in the accompanying drawing in which Figure I is a plan of the apparatus with a portion broken away to disclose operating parts and with other operating parts shown in dotted lines.

Figure II is an elevation view of the apparatus showing certain of the operating parts in dotted line.

Figure III is a section on line A—A of Fig. I, one only of the men being shown.

Figure IV is a detail section along the cam shaft on line B—B of Fig. I.

Figure V is an elevation view of the right end of Fig. IV illustrating different positions of the cam shaft and associated parts.

Figure VI is a detail view of the cams from line C—C to Fig. IV.

Figure VII is a detail of one of the mechanical men with associated operating parts.

Figure VIII is a side elevation of Fig. VII.

Figure IX is a detail view partly in section on line D—D of Fig. VII.

Figure X is a sectional detail of the mechanism for setting up the men which have been knocked down.

Figure XI is a section on line E—E of Fig. X.

The original or genuine battle royal or gang fight in which a considerable number of fighters are turned loose in the fighting area and each one left to choose his respective and successive opponent, the winner being the one who remains standing after all the others are down, is an interesting and exciting amusement, and it is the purpose of the present invention to produce mechanically a simulation of this amusement.

I am aware that various games, contests and activities of both human beings and animals have been mechanically simulated and that some of the mechanical parts, movements and constructions used by me have been used in such mechanisms and in mechanical arts generally, but to the best of my knowledge the result which I accomplish by the present invention has not before been accomplished either in exact form or in substantial similarity, nor has there been any combination of mechanical parts, structures or movements capable of producing this result either in exact form or in substantially similar form, and to the best of my knowledge some of the structures used by me in this apparatus are new and peculiarly adapted for the accomplishment of the objects and results stated.

In the present and preferred embodiment of this invention, I provide a box or enclosure 1 having the top 2 preferably surrounded with a railing 3 supported by corner posts 4 in simulation of the pugilistic ring, the central portion of the top 2 is divided into a plurality of ring sections which may be of any desired number, but here illustrated as three, being respectively designated as 5, 6 and 7.

Each of the rings 5, 6 and 7 is provided on its under side with a track designated as 5a, 6a and 7a, respectively, and the rings are revolubly supported on operating shaft 8 and idler shaft 9 both mounted in the walls of the box 1 and preferably at right angles to each other, each of the shafts 8 and 9 being provided with wheels adapted to engage and support the tracks 5a, 6a and 7a, some of said wheels being fixed to the operating shaft so as to revolve therewith and to cause revolution of the rings 5, 6 and 7 carrying the tracks respectively contacting with said drive wheels which wheels are indicated as 5b, 6b and 7b. The remaining wheels on the operating shaft 8 are not affixed to the shaft, but are mounted as idlers, and serve simply the purpose of rolling supports for the tracks 5a, 6a and 7a with which they contact. These idler wheels on the operating shaft are designated as 8a and a suitable idler mounting of the wheels 8a on the operating shaft is clearly indicated at Fig. III, and, as the invention is not in any manner dependent upon any particular form of mounting of these wheels on the shaft, such mounting will not be more particularly described.

In order to suitably but rollingly support the rings 5, 6 and 7 the idler shaft 9 is provided with a plurality of idler wheels 9a, one being positioned under each of the rings 5, 6 and 7 on each side of the center. The idlers 9a may be mounted upon the idler shaft 9 in the same manner as the idlers 8a upon the operating shaft 8 or in any other suitable manner.

By means of the above described arrangement of operating and idler shafts and the wheels carried thereby, each of the rings 5, 6 and 7 is given a rolling support at four points. Obviously, additional idler shafts and idler wheels may be provided if desired, but in practice I have found that the rings are suitably rollingly supported by means of the one drive shaft and the one idler shaft with their wheels as above described.

The connection between the track 5a and the drive wheel may be accomplished by making the track 5a in the form of a rack and the wheel 5b in the form of a pinion, both as illustrated in the drawing, but this construction is optional and any other means of forming the connection between drive wheel 5b and the track 5a, as for instance by friction, may be employed. The same is true of the tracks and wheels 6a—6b and 7a—7b.

One of the features of this invention is the revolution of the plurality of rings in alternately opposite directions and this is accomplished by alternating the drive wheels 5b, 6b and 7b with the idlers 8a as clearly shown in Fig. III resulting in the revolution of rings 5 and 7 in one direction and the intermediate ring 6 in the opposite direction all as indicated by the arrows on Fig. I.

The drive shaft 8 is revolubly mounted in any suitable manner and preferably in or at the walls of the box 1, as clearly illustrated at 8b in Fig. III and for rigidity the shaft is also preferably provided with other supports such as standard 10 having arms 11 carrying sleeves 12 for revolubly supporting the shaft 8.

The shaft 9 is formed in two sections which may be mounted as clearly illustrated in Figs. I and III, having one end of each section rigidly supported in the walls of the box as at 13 and the other end in cross member 14 of the supporting standard 10. By this construction the idler shaft 9 may be in the same plane as the operating shaft 8 without crossing or interfering with the same. This construction of the idler shaft is preferable, but I do not wish to be limited to this specific construction, as other means for furnishing rolling support for the rings will be obvious to those skilled in the art.

The shaft 8 may be revolved by any suitable mechanism, as by the worm drive, generally illustrated at 15 and operated by a motor 16.

On each of the rings 5, 6 and 7, in the manner hereinafter specifically described, I mount a plurality of mechanical men 17 having arms 18 affixed at their shoulders as at 19 to a crank shaft 20, the crank 21 of which is revolubly engaged by rod 22 carrying a roller 23 at its lower end, which roller is adapted to roll upon the wavy or corrugated track 24, mounted beneath and concentric with the rings 5, 6 and 7, respectively, whereby to impart a vertical reciprocation to the rod 22 as the wheel 23 travels along and over the corrugations of track 24, and whereby in turn to cause the crank 21 to oscillate, thus giving the arms 18 an up and down movement simulating the movement of the arms of a fighter, it being understood that the two arms 18 of each man are affixed to the shaft 20 in different positions, as clearly illustrated at Figs. VII and VIII.

The operation of the mechanism thus far described will obviously result in the plurality of men moving over the top of the box in various directions with their arms moving up and down, thus imitating in a mechanical and necessarily somewhat limited form the movements of the fighters in the original battle royal. The effect is obviously accentuated by the movement of the rings 5, 6 and 7 in alternately opposite directions.

Each of the men is fixedly mounted on a platform 25, which platform is pivotally mounted as at 26 on a pin 27 in a cut away portion 28 of the ring carrying the man whereby the platform 25 may either lie upon the surface of the ring, as clearly shown in Figs. VII and VIII, or may tip to a vertical position as shown in dotted lines in Fig. VIII. Under each platform is an upset spring 29 which will normally throw the platform 25 into vertical position, thus upsetting the man. A trigger 30 is provided pivotally mounted as at 31 and having a catch 32 for engaging and normally holding in horizontal position the platform 25, thus normally holding upright the man on the platform. A portion of the ring is cut away as at 33 to accommodate the trigger and allow for movement thereof, as clearly illustrated at Fig. VIII. It will be obvious that when the trigger 30 is moved to the right, as viewed in Fig. VIII, the catch 32 will be disengaged from the platform 25, whereupon the spring 29 will upset the platform 25 and the man 17 to the position shown on dotted line in Fig. VIII and indicated in solid lines at Fig. XI.

It will be understood that suitable means are provided for maintaining the rod 22 in suitable position with relation to the man 17 at all times regardless of the position of the man. This is accomplished by passing the rod down through one leg of the man as clearly indicated in dotted lines in Figs. VII and VIII and through a hole 34 in the platform, the hole 34 being large enough to allow for the necessary movement of the rod 22 when in operation but being small enough so as to always hold the rod in position to contact with the corrugated track 24 when the man is uprighted.

The platform 25 is also provided with a dog 35 adapted to contact with cams hereafter described for the purpose of again uprighting the man by returning the platform 25 to horizontal position, all as hereinafter described.

The knock-down mechanism for operating the triggers 30 is illustrated in detail at Figs. IV, V and VI, and comprises a cam shaft 36 revolubly supported in suitable mountings 37 carried by a frame 38 pivotally mounted by means of a pin 39 carried by lugs 40 on the base 1a of the box 1. The side of the box is cut away as at 41 to permit the swinging of the shaft 36 which shaft carries a friction wheel 42 adapted, when the shaft 36 is swung toward the operating shaft 8, to contact with another friction wheel 43 carried on the end of the operating shaft 8 whereby the revolution of the operating shaft will revolve cam shaft 36. A handle 44 is provided for swinging the shaft 36 on its pivotal mounting and in the slot 41 whereby the shaft 36 may be swung into and out of operating position.

The shaft 36 carries three cams shown in detail at Fig. VI. These cams are indicated respectively by the numerals 45, 46 and 47 and are positioned on the cam shaft so that they will respectively align and contact with the triggers 30 on rings 5, 6 and 7, for actuating the triggers and releasing the catches 32 whenever these cams in course of their revolution with the shaft 36 come in contact with said triggers.

These cams are affixed to the shaft 36 by set screws, as clearly illustrated in Figs. IV and VI, or by any other suitable means, and may be positioned on the shaft in relatively staggered or irregular positions, as also clearly illustrated at Fig. VI, whereby the times at which the cams will contact with the various triggers may be rendered entirely irregular and undeterminable. In the embodiment here shown the men on the inner ring 7 will pass over the cam shaft 36 at more frequent intervals than the men on the other rings, and for that reason it has been found convenient to make cam 47 a single ended cam, whereas the cams 45 and 46 are double ended cams. The relative arrangement of these cams as to the number of points on each is optional, and the points may be actually or relatively increased or diminished as desired, but in actual practice the above described arrangement of double points on the cams 45 and 46 and a single point on the cam 47 has been found satisfactory in the present embodiment, in which there are four men on the inner ring 7, six men on the middle ring 6, and eight men on the outer ring 5. The number of men on the respective rings may of course be varied as desired.

For holding cam shaft 36 in operative position so that the friction wheels 42 and 43 will be in contact, I provide a catch pivoted to the wall of the box as at 48 and having an arm 49 with a notch 50 for engaging the cam shaft 36 when it is in operative position. The device is held in engagement with the cam shaft by any suitable means as spring 51 and a handle or trigger 52 may be provided for lifting the catch out of engagement and permitting the movement of the cam shaft out of operative position.

To set up the men after they have been knocked down I provide a mechanism shown in detail in Figs. X and XI comprising a raisable frame carrying cams for engaging the dogs 35. This mechanism may be provided with a base 53 attached to the floor 1a of the box and carrying standards 54 and 55 and are attached by brace member 58 at the bottom and cam bar 59 at the top, whereby a substantially rigid frame work is formed which is slidable vertically upon the standards 54 and 55. The cam bar carries keyed thereto a plurality of cams 60, 61 and 62, one being provided for the dogs 35 on each of the rings 5, 6 and 7, there being as many of the cams on cam bar 59 as there are rings in the top 2 of the box. These cams are adjustable lengthwise of the cam bar 59 in order to align them with the dogs 35, and they are also adjustable around the bar so that they may be positioned to slidingly or slantingly engage the dogs 35 on each ring in whichever direction the ring is moving. This requires the slanting of some of the cams in one direction and others in the opposite direction, as clearly shown in Fig. XI.

For operating the setting up mechanism, I preferably provide a lug 63 on which at 64 I fulcrum a lever 65 which may be depressed by a button 66 on top of rod 67 pivoted to the lever as at 68 and normally held in raised position by a compression spring 69 between the button 66 and the top 2 of the box 1, it being understood that suitable holes are provided in the top of the box and in the bed of the track 24 to permit the rod to operate therethrough. The end of the lever is attached to the central portion of the base member 58 by a slot and pivot as at 70 whereby when the button 66 is depressed and the lever 65 acting on the fulcrum 64 will raise the cam frame work through the base member 58.

In one of the cylinders as 56 I provide a slot 71 and in standard 54 I provide a pin 72 extending through the slot and so positioned as to act as a stop to the upward movement of the frame work when the bottom of the slot 71 contacts with the pin 72 so that the cams 61 and 62 are prevented from being raised farther than is necessary in order to operate the dogs 35.

It will be understood that the track 24 and its operating bed will be cut away at suitable points to accommodate the other portions of the apparatus and such cutting away is clearly shown in Figs. I and III.

It will be understood that when the cams 60, 61 and 62 contact with the dogs 35, they will force the same into the positions shown most clearly in Fig. VIII and in so doing will cause the forward edge of the platform 25 to displace the catch 32 by reason of the relatively beveled edges of the base 25 and catch 32 and as soon as the edge of the base 25 has passed below the point of the catch 32 the catch will fall into normal position and engage and hold the edge of the base 25 as clearly shown in Fig. VIII.

In operation the men are all in upright position, as shown in Figs. II, III, VII and VIII. The rings are revolved by starting the motor 16 which operates the drive shaft 8 through the worm gear 15. The arms are moved up and down as the wheel 23 passes over the corrugations of track 24 and whenever one of the triggers 30 contacts with one of the cams 45, 46 and 47, the catch 32 is released and the spring 29 raises the base 25 and drops the man to prostrate position, it being understood that during operation the cam shaft 36 is operating, the friction wheels 42 and 43 being in contact whereby the cams 45, 46 and 47 are being revolved. The operation of the machine is continued until only one man is left standing, and it will be found that by reason of the positions of the men on the different rings and the irregular arrangement and operation of the cams 45, 46 and 47 and the different directions, movements and speed of the rings 5, 6 and 7, the results are entirely incapable of previous determination; that is to say, that it is impossible to tell in advance which man is going to be left standing, and for this reason the operation of the apparatus as a game is very unusual and interesting and the device will have great value as an amusement device in amusement parts and the like.

When all of the men but one are down, the cam shaft 36 will be released from the catch 49 and will be moved out of operative position and the button 66 will be depressed while the operating shaft 8 is moving, and this will result in again setting up all the men ready for a repetition of the above described operation.

It will be understood that many changes may be made in the details of the construction without in any manner affecting the desired results above described and without departing in any way from the spirit and scope of the invention as hereinabove described or of the appended claims.

I claim—

1. A game mechanism comprising a plurality of concentric rotatable rings of different sizes and in a common plane, a shaft positioned beneath and diametrically of said rings and carrying, for each of said rings, a drive wheel and an idler supporting-wheel under respectively opposite sides of such ring, said drive wheels and idler wheels being alternated under the successive rings whereby to cause said rings to rotate in alternately relatively reversed directions and at different speeds according to their relative sizes, a plurality of men carried by each of said rings, said men being normally upright and means for upsetting said men in irregular order as they move with said rings in different directions and at different speeds.

2. In a game mechanism, in combination, a plurality of concentric rotatable rings of relatively different diameters and in a common plane, means for rotating said rings in alternately opposite directions and at different speeds inversely according to their relative diameters, a plurality of men carried by each of said rings in normally upright position, means for upsetting said men automatically but in irregular order and means manually movable into operative position for setting up the upset men.

3. In a game mechanism having normally standing men arranged in a plurality of concentric circles and means for rotating the same in alternately opposite directions, means, including a rotatable shaft carrying irregularly arranged trips, for knocking down the men in irregular and previously undeterminable order.

4. In a game mechanism having normally standing men arranged in a plurality of concentric circles and means for rotating the same in alternately opposite directions, means, including a rotatable shaft carrying irregularly arranged trips, for knocking down the men in irregular and previously undeterminable order, and means for keeping the arms of the men in motion while said men are in standing position and in motion, said arm operating means of each man being displaced from operative position by the knocking down of such man.

5. A game mechanism comprising a plurality of concentric rings in a common plane, a plurality of men pivotally mounted in each ring and adapted to swing to and between standing and prostrate positions, a releasable catch for normally holding each man in standing position, means for prostrating each man upon release of the catch, means for rotating said rings in alternately opposite directions and at different speeds, means, rendered inoperable by prostration of the man, for actuating the arms of each man and a trip adjacent each ring for releasing said catches for prostrating the men, said trips being relatively irregularly arranged whereby to prostrate said men in irregular and previously undeterminable order.

6. In a game mechanism having a plurality of men upsettably mounted in each of a plurality of concentrically rotatable rings, means for upsetting the men as the rings rotate and means for resetting the men as the rings rotate, said resetting means comprising a contact member associated with each man and adapted, when pressed, to reset said men, a frame, manually movable into operative position, carrying a plurality of cams, one for each of said rings, each of said cams being adjustable on said frame to press the contact members on one of said rings as said ring is rotated.

7. In a game mechanism having a plurality of upsettable men mounted in each of a plurality of concentrically rotatable rings, a single operating element for rotating all of said rings simultaneously but in alternately opposite directions and with speeds varying by reason of the varying diameters of said rings, a releasable retainer for normally holding each man upright, rotatable cams adjacent and adapted, during a part of their rotation, to project into the line of travel of said retainers, whereby a retainer passing a cam during said part of the cam's rotation will be released by said cam.

In testimony whereof I affix my signature.

HARRY A. BUNTE.